United States Patent [19]

Anno et al.

[11] 4,364,063

[45] Dec. 14, 1982

[54] THERMAL RECORDING APPARATUS

[75] Inventors: Gousuke Anno; Takashi Oozeki, both of Kawasaki, Japan

[73] Assignee: Tokyo Shibaura Denki Kabushiki Kaisha, Japan

[21] Appl. No.: 238,602

[22] Filed: Feb. 26, 1981

[30] Foreign Application Priority Data

Mar. 31, 1980 [JP] Japan .................................. 55-41542

[51] Int. Cl.³ ............................................ G01D 15/10
[52] U.S. Cl. ................................ 346/76 PH; 219/216; 400/120
[58] Field of Search ................... 346/76 PH; 219/216; 400/120

[56] References Cited

U.S. PATENT DOCUMENTS

| | | | |
|---|---|---|---|
| 3,951,247 | 4/1976 | Montanari | 346/76 PH X |
| 3,984,844 | 10/1976 | Tanno | 346/76 PH |
| 4,070,587 | 1/1978 | Hanarata | 346/76 PH X |
| 4,149,171 | 4/1979 | Sato | 346/76 PH X |
| 4,219,824 | 8/1980 | Asai | 346/76 PH |
| 4,246,587 | 1/1981 | Reilly | 346/76 PH X |
| 4,271,414 | 6/1981 | Williams | 346/76 PH |
| 4,284,876 | 8/1981 | Ishibashi | 219/216 |
| 4,305,080 | 12/1981 | Cunningham | 346/76 PH |
| 4,309,712 | 1/1982 | Iwakura | 346/76 PH |

FOREIGN PATENT DOCUMENTS 54-54659  1/1979  Japan .

*Primary Examiner*—Joseph W. Hartary
*Attorney, Agent, or Firm*—Schuyler, Banner, Birch, McKie & Beckett

[57] ABSTRACT

The thermal recording apparatus of the present invention includes a plurality of thermal resistive elements placed in a line, a plurality of drive circuits connected to the thermal resistive elements to drive the thermal resistive elements and a plurality of latch circuits connected to the drive circuits to supply recording signals in order to the drive circuits. A first memory receives and stores incoming recording signals formed by a series of 1 and 0 signals. These recording signals are supplied to the latch circuits. A second memory stores previously received recording signals which are output from the first memory. A comparator then compares the incoming recording signals with the previously received recording signals after the first memory supplies the incoming recording signals to the latch circuits. The comparator generates modified recording signals. The modified recording signals include 0 signals which are generated when 1 signals in the incoming recording signals follow 1 signals in the previously received recording signals. These modified recording signals are supplied to the latch circuits after the incoming recording signals are supplied to the drive circuits. Thus, if successive 1 signals occur in the same bits of the recording signals, the latch circuits and drive circuits do not receive successive 1 signals so the thermal resistive elements are not continuously driven. By using such a modified recording signal to drive the thermal resistive elements for part of the time period, burn out of the thermal resistive elements can be prevented.

4 Claims, 5 Drawing Figures

THERMAL RECORDING APPARATUS

BACKGROUND OF THE INVENTION

This invention relates generally to thermal recording apparatus, and more particularly, to thermal recording apparatus in which a line of thermal resistive elements are selectively driven according to recording signals.

Thermal recording techniques have spread rapidly because of easy maintenance and clean recording. In such techniques, figures are usually recorded on a thermal sensitive paper by selectively actuating a line of recording elements (i.e., thermal resistive elements) in accordance with incoming recording signals.

Generally, in prior art thermal recording apparatus, a matrix circuit is used to decrease the number of drive elements and lead lines. A recently developed recording apparatus drives all the thermal resistive elements at the same time according to the recording signals without a matrix circuit; this apparatus results in high recording speed. In thermal recording apparatus using matrix circuits, each group of thermal resistive elements is driven in turn so all the thermal resistive elements have enough off time. On the other hand, in the recording apparatus in which all the thermal resistive elements are driven at the same time, there are occasions where the thermal resistive elements do not have enough off time because some elements may be continually driven. When these elements are continually driven, they overheat, which causes uneven recording density. Also, these elements sometimes break up due to overheating.

One method for preventing overheating is to decrease the supply of energy to these elements when these elements are continually driven. Such a method using monostable multivibrators is disclosed in Japanese patent publication No. 54-659. Namely, recording signals are supplied to drive circuits through monostable multivibrators triggered by recording signal pulses. The turn on time of the elements is equal to the time of the quasi-stable state of the monostable multivibrator. When the time between recording signal pulses (i.e., time between trigger pulses of the monostable multivibrator) is shorter than the intrinsic time of the quasi-stable state, the time of the quasi-stable state shortens and overheating is avoided.

The latter method has the disadvantage that it is difficult to optionally determine the ratio of turn on time Ta in case of turning on independently to turn on time Tb in case of turning on continually. Accordingly, it is difficult to avoid both overheating and unevenness of recording density.

SUMMARY OF THE INVENTION

It is one object of this invention to provide a thermal recording apparatus which can record at high speed.

It is another object of this invention to provide a thermal recording apparatus which can prevent overheating of thermal resistive elements.

It is yet another object of this invention to provide a thermal recording apparatus which can obtain recording images without unevenness of density.

According to this invention, the foregoing and other objects are attained by providing a particular thermal recording apparatus. The thermal recording apparatus includes a line of thermal resistive elements, a plurality of drive circuits connected to the thermal resistive elements to drive the thermal resistive elements and a plurality of latch circuits connected to the drive circuits to supply recording signals to the drive circuits. A first memory stores incoming recording signals, inputted to the apparatus in series and comprising 1 and 0 signals, and supplies these incoming recording signals to the latch circuits. A second memory stores previously received recording signals and a comparator compares the incoming recording signals with the previously received recording signals after the first memory supplies the incoming recording signals to the latch circuits. The comparator generates modified recording signals. For example, a 1 signal in the presently received recording signals which follows a 1 signal in the received recording signals may be changed to a 0 signal by the comparator and supplied to the latch circuits. This latter signal is a modified recording signal and it is supplied to the drive circuits after the presently received recording signals are supplied to the drive circuits.

Namely, in this invention, after the presently received recording signals are supplied to the latch circuits, the modified recording signals are generated by comparison of the presently received recording signals and the previously received recording signals. Every correspondent bit is compared and the resulting signal is supplied to the latch circuits. By this invention, the turn on time of the thermal resistive elements can be optionally and independently determined to prevent burn out of these elements when successive 1 signals in the recording signals are received.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which.

DESCRIPTION OF THE PREFERRED EMBODIMENT

Figure 1:
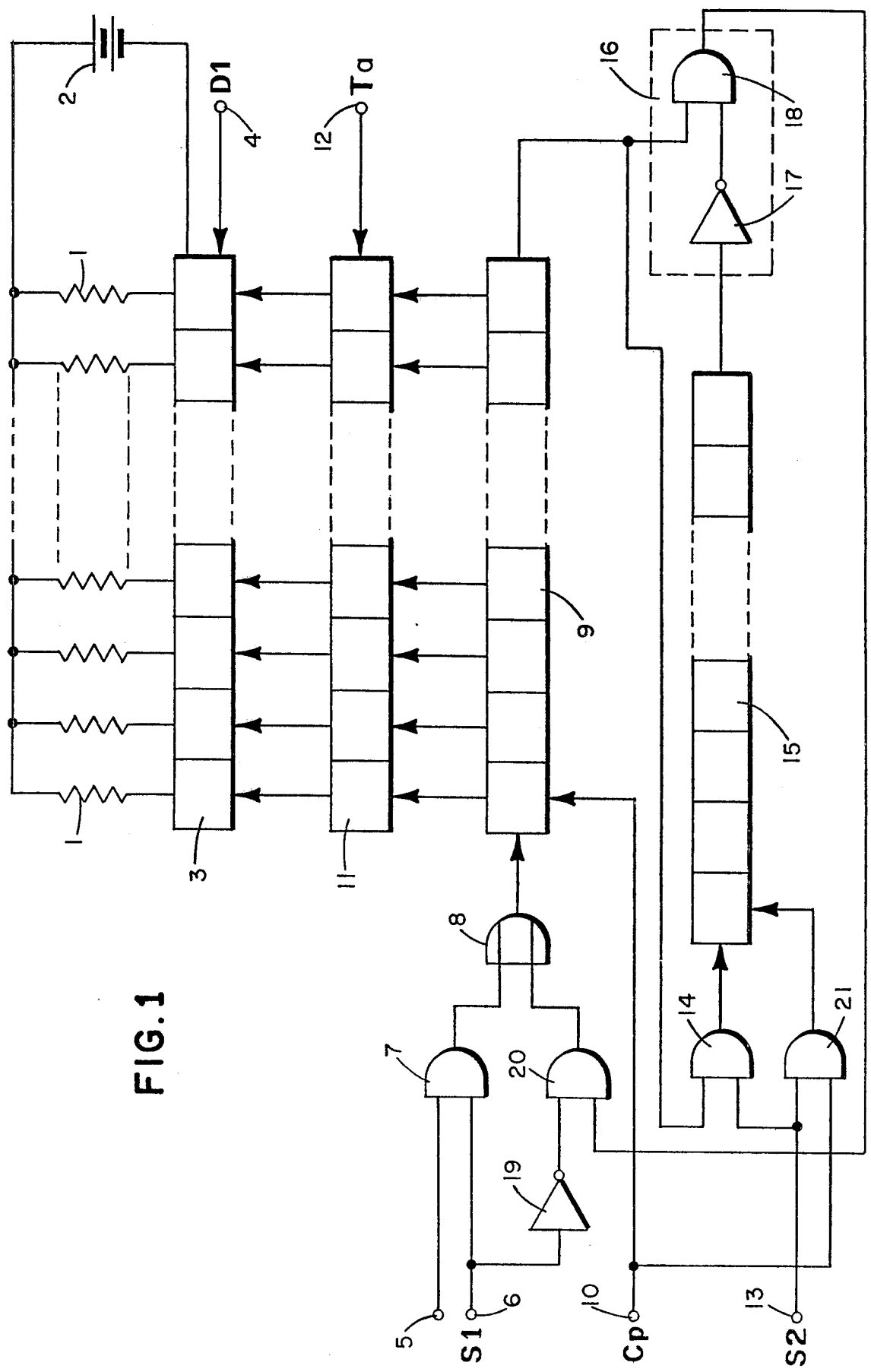
FIG. 1 shows a wiring diagram of one embodiment of the apparatus of this invention.

One embodiment of this invention is shown in FIG. 1. Thermal resistive elements 1 are placed in line on an insulated substrate (not shown). For example, an A4 size thermal head has 1728 elements. One terminal of all these thermal resistive elements 1 is connected in common to an external power source 2 and the other terminal is connected to the power source 2 through a plurality of drive circuits 3.

Drive circuits 3 are formed by switching elements and these switching elements are turned on upon receipt of recording signals from latch circuits 11 and drive signals D1 from drive terminal 4. Current then flows from each drive circuit independently into thermal resistive elements 1.

Recording signals (e.g., facsimile signals of 1728 bits each line) are serially supplied to signal terminal 5. These recording signals are supplied into a first memory, namely shift register 9, through AND gate 7 and OR gate 8, which are controlled by timing signals S1 inputted at timing terminal 6. Shift register 9, which has a capacity of 1728 bits, transfers or shifts the recording signals supplied from signal terminal 5 to the right under control of clock signals $C_p$ at a clock terminal 10 and stores the recording signals of one entire line. The recording signals stored in shift register 9 are supplied to latch circuits 11 in parallel under control of latch trigger signals Tl supplied to latch terminal 12.

On the other hand, recording signals stored in shift register 9 are outputted in series and supplied to a second memory, namely shift register 15, through AND gate 14, which is controlled by timing signal S2 input at timing terminal 13. Shift register 15, which has a capacity of 1728 bits, transfers or shifts the recording signals in order to the right under control of clock signals input through AND gate 21, which is also controlled by timing signal S2. The shift register 15 stores the recording signals.

The previously received recording signals stored in shift register 15 (i.e., the recording signals received during a previous cycle) are read out in series and compared bit by bit with the recording signals read out from shift register 9 (i.e., the presently received recording signals) in a comparator 16. Comparator 16 comprises inverter 17 which inverts the recording signals read out from shift register 15 and AND gate 18 which logically adds the inverted signals of the previously received recording signals from inverter 17 and the presently received recording signals from shift register 9. The logical addition of these signals results in modified recording signals where a 1 signal in the presently received recording signals which follows a 1 signal in the previously received recording signals is changed into a 0 signal. These modified recording signals are supplied to shift register 9 through AND gate 20, which is controlled by timing signals S1 through inverter 19, and OR gate 8.

Figure 2:
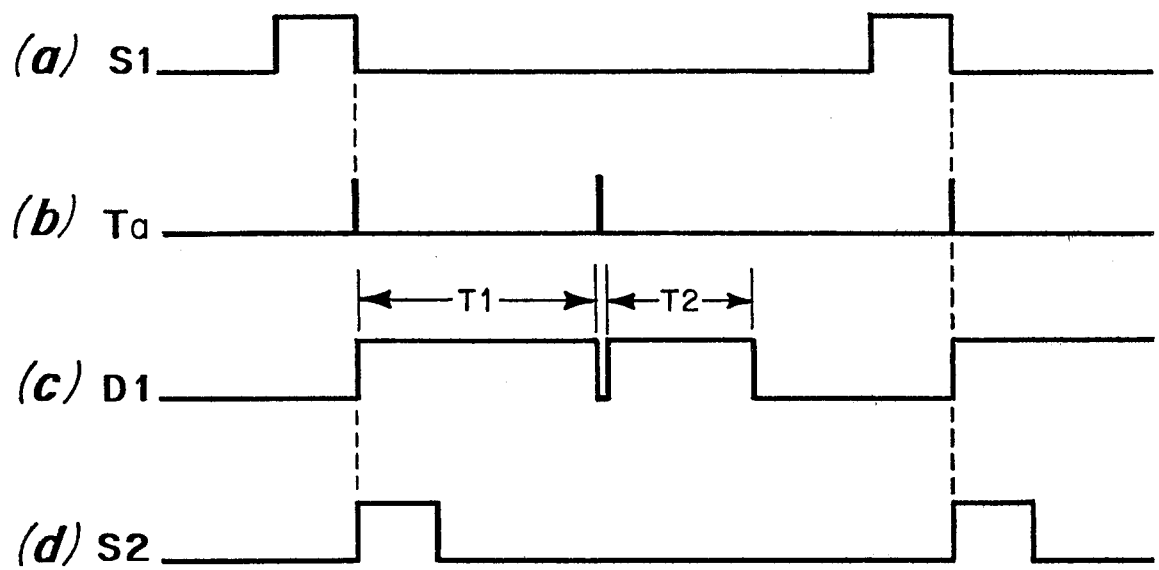
FIG. 2 shows wave forms for the apparatus shown in FIG. 1.

The operation of the above embodiment now will be explained with reference in FIG. 2. At first, the content of shift register 9 and shift register 15 are all 0 signals. Then, recording signals of one line are input at signal terminal 5 in series. These recording signals are supplied to shift register 9 through AND gate 7 and OR gate 8 by clock signals Cp while timing signal S1 maintains a 1 level (see FIG. 2(a)).

After the recording signals of one line are completely stored in shift register 9, a latch trigger signal Ta is supplied to latch terminal 12 as shown in FIG. 2(b). Then each latch circuit 11 latches one bit of the recording signals stored in shift register 9. Next, a drive signal D1 having pulse width T1 is supplied to drive terminal 4 as shown in FIG. 2(c). The drive circuits supplied with a 1 signal (i.e., black signal from latch circuits 11) turn on during time T1 to drive the corresponding thermal resistive elements 1.

The recording signals of one line stored in shift register 9 then are read out in series from final memory unit (the right-most memory unit). During this time, timing signal S2 maintains a 1 level at timing terminal 13. Accordingly, the recording signals read out in series from the final memory unit of shift register 9 are supplied to shift register 15 through AND gate 14. Shift register 15 transfers or shifts the recording signals under control of clock signal Cp, which is supplied through AND gate 21, and timing signal S2. Thus, shift register 15 stores the recording signals output from shift register 9 in series and at the same time outputs its stored signals from a final memory unit (the right-most memory unit) of shift register 15. The outputs of shift registers 9 and 15 are compared bit by bit in comparator 16 while timing signal S2 maintains a 1 level. Initially, recording signals output from the final memory unit of shift register 15 are all 0 signals; thus, the serial signals of inverter 17 are all 1 signals. Accordingly, the output signals of AND gate 18 are the same as the recording signals output from the final memory unit of shift register 9. The output signals of comparator 16 are supplied to shift register 9 in series through AND gate 20 and OR gate 8. The recording signals stored in shift register 9 are the same as the recording signals supplied at signal terminal 5 and these signals again are stored in shift register 9. After storing, latch circuits 11 latch the recording signals in parallel by latch trigger signal Tl and then drive circuits 3 selectively drive thermal resistive elements 1 by a drive signal T2 (T2<T1) as shown in FIG. 2(c). Accordingly, the turn on time of the selected thermal resistive elements is T1+T2.

When recording signals of the next line are supplied to signal terminal 5, a similar operation is executed. Namely, the recording signals of the next line are stored in shift register 9 and drive circuits 3 drive thermal resistive elements 1 according to the recording signals. Then, the presently received recording signals are output from shift register 9 and compared in comparator 16 with previously received recording signals output from shift register 15. Since the previously received recording signals are inverted in inverter 17, the output of comparator 16 only becomes 1 when the output of shift register 9 is 1 and the output of shift register 15 is 0.

If Xn designates information of the nth bit of the presently received recording signal and Yn designates information of the nth bit of the previously received recording signal, the nth output signal of comparator 16 can be designated as $Zn = Xn \cdot \overline{Yn}$. Accordingly, when $Xn=1$ and $Yn=0$, $Zn=1$. When $Xn=0$, $Zn=0$. When $Xn=1$ and $Yn=1$, $Zn=0$.

Figure 3:
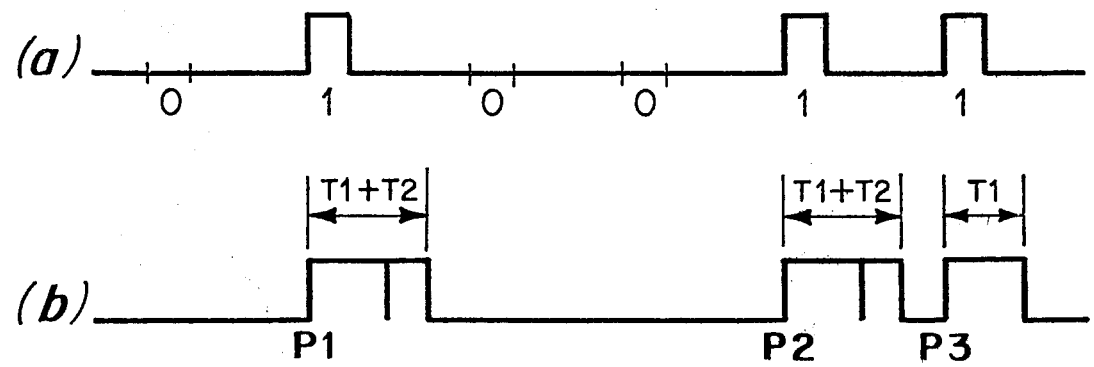
FIG. 3(a) shows a recording signal waveform and FIG. 3(b) shows a corresponding drive signal.

At the end time of timing signal S2, the output signals of comparator 16 (i.e., the modified recording signals) are stored in shift register 9 instead of the presently received recording signals. Latch circuits 11 latch the modified recording signals by a latch trigger signal Ta. Drive circuits 3 are driven by drive signal D1 having pulse width T2 and the modified recording signals latched by latch circuits 11. Current flows during time periods (T1+T2) in the thermal resistive elements 1 corresponding to bits in which the previously received recording signal is 0 and the presently received recording signal is 1 as shown by pulses P1 and P2 in FIG. 3. Current flows during time period T1 in thermal resistive elements 1 corresponding to bits in which the previously received recording signal is 1 and the presently received recording signal is 1 as shown by pulse P3 in FIG. 3. FIG. 3(a) shows an example of the changes in one bit of the recording signal and FIG. 3(b) shows the turn on time of the corresponding thermal resistive element.

In the above embodiment, two turn on times T1 and T2 can optionally be determined by changing the width of drive signal D1. Accordingly, the turn on time T1 is set so the thermal resistive elements 1 do not overheat in case of continual recording. That is, if successive 1 signals occur in any particular bit as shown in the 5th and 6th cycle of the recording signal in FIG. 3(a), then the turn on time is changed from (T1+T2) to T1 to prevent burn out of the corresponding thermal resistive element 1. The turn on time T2 is set so that (T1+T2) is enough time to record. By experiment, when T1/(T1+T2) is 60% (e.g., T1=1.2 msec and (T1+T2)=2.0 msec), the best recording is achieved.

By the above embodiment, two shift registers are sufficient because the modified recording signals are supplied into the same shift register which receives the original or presently received recording signals.

Figure 4:
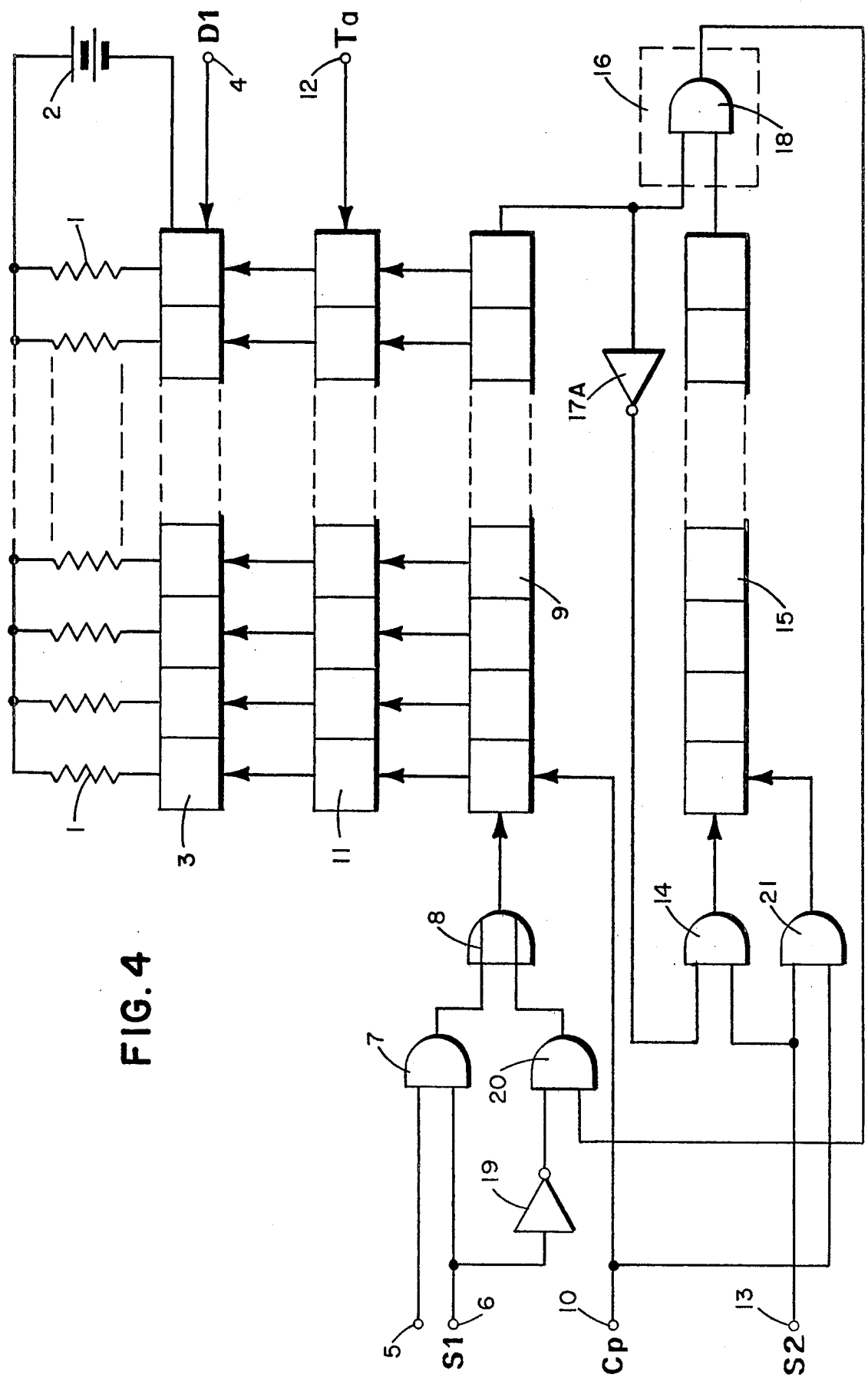
FIG. 4 shows a wiring diagram of another embodiment of this invention.

In the embodiment of FIG. 1, the output signals of shift register 15 are inverted in comparator 16. However, it is possible to invert the input signals of shift register 15 instead as shown in FIG. 4. In FIG. 4, when timing signal S2 is supplied to timing terminal 13, the recording signals read out from shift register 9 are inverted by an inverter 17A and stored in shift register 15 through AND gate 14. The output of shift register 9 is directly compared with the output of shift register 15 in comparator 16, which comprises AND gate 18.

Figure 5:
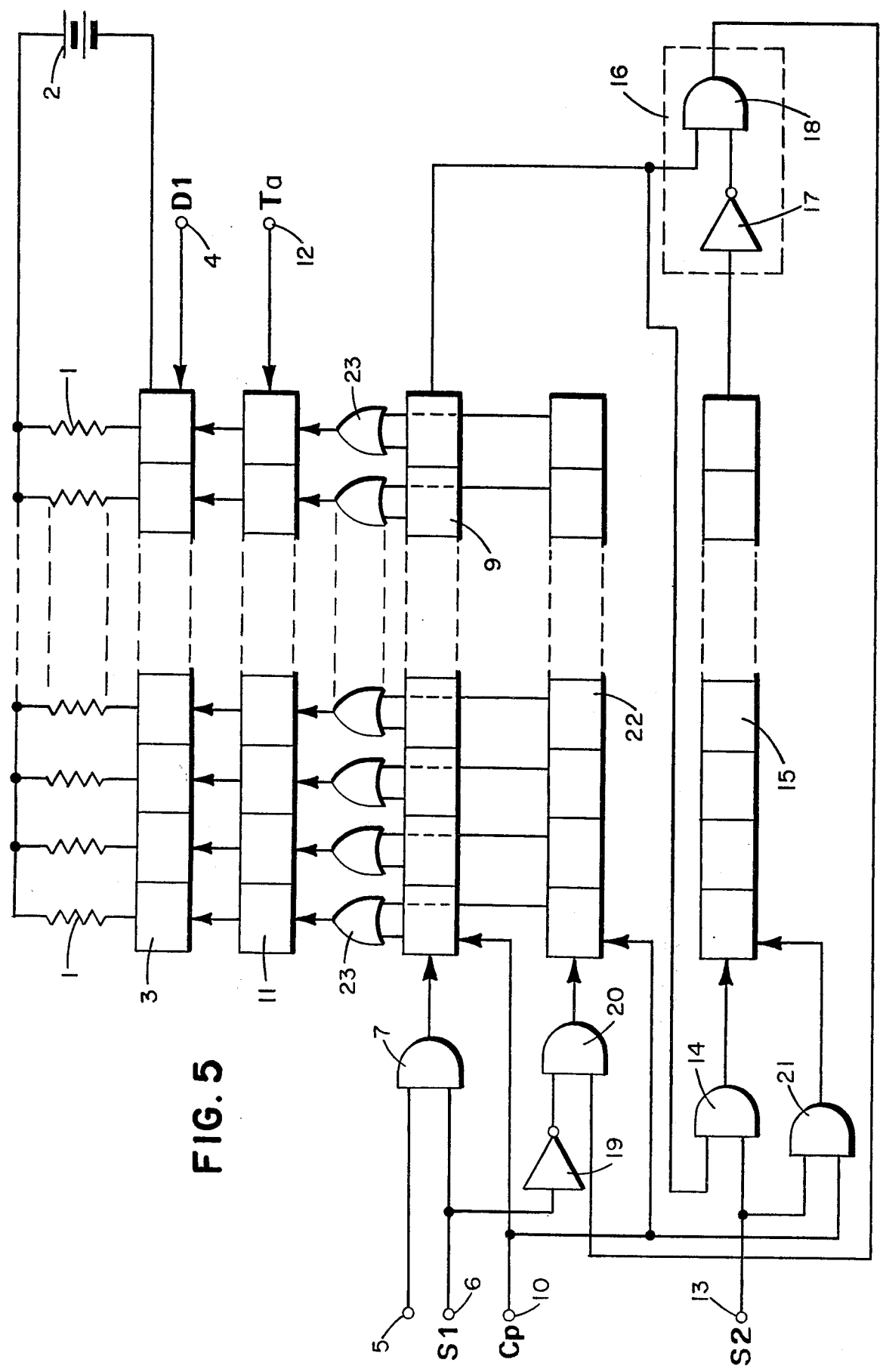
FIG. 5 shows a wiring diagram of another embodiment of this invention.

Another embodiment is shown in FIG. 5. In this embodiment, a third shift register 22 is used to store the modified recording signals. The modified recording signals and the recording signals supplied from signal terminal 5 are supplied to latch circuits 11 through OR gates 23. Namely, after the recording signals stored in shift register 9 are supplied to latch circuits 11 through OR gates 23, the recording signals are supplied to shift register 15 through AND gate 14. After the recording signals are supplied to latch circuits 11, the modified recording signals are generated by comparator 16 and supplied to shift register 22 in series through AND gate 20. Then the modified signals are supplied to latch circuits 11 through OR gates 23.

In all the above embodiments, the structure of the comparator is simple, because the presently received recording signals are compared with the previously received recording signals in series.

Obviously, many modifications and variations of this invention are possible in the light of the above teachings. It is therefore to be understood that, within the scope of the appended claims, this invention may be practiced otherwise than as specifically described.

We claim:

1. A thermal recording apparatus comprising:
a plurality of thermal resistive elements placed in line;
a plurality of drive circuits connected to said thermal resistive elements for driving corresponding ones of said thermal resistive elements;
a plurality of latch circuits connected to said drive circuits for supplying recording signals to corresponding ones of said drive circuits;
a first memory for receiving and storing incoming recording signals which are input in series and formed by 1 and 0 signals, said first memory supplying the incoming recording signals to said latch circuits;
a second memory coupled to an output of said first memory for receiving recording signals from said first memory and storing the previously received recording signals; and
a comparator connected to said first and second memory for comparing the incoming recording signals with the previously received recording signals to generate modified recording signals, the modified recording signals including 0 signals which are generated by said comparator when 1 signals in the incoming recording signals follow 1 signals in the previously received recording signals, said comparator being coupled to said first memory to store the modified recording signals in said first memory, said first memory supplying the modified recording signals to said latch circuits after the incoming recording signals are supplied to said drive circuits.

2. A thermal recording apparatus comprising:
a plurality of thermal resistive elements placed in a line;
a plurality of drive circuits connected to said thermal resistive elements for driving corresponding ones of said thermal resistive elements;
a plurality of latch circuits connected to said drive circuits for supplying recording signals to corresponding ones of said drive circuits;
a first shift register for receiving and storing incoming recording signals which are input in series and formed by 1 and 0 signals, said first shift register supplying the incoming recording signals to said lach circuits;
a second shift register coupled to an output of said first shift register for receiving previously received recording signals from said first register and storing the previously received recording signals; and
a comparator connected to said first and second shift registers for comparing the incoming recording signals with the previously received recording signals bit by bit to generate modified recording signals, the modified recording signals including 0 signals which are generated by said comparator when 1 signals in the previously received recording signals follow 1 signals in the incoming recording signals, said comparator being coupled to said first shift register to supply the modified recording signals to said first shift register after the incoming recording signals are supplied to said latch circuits, said first shift register then supplying the modified recording signals to said latch circuits.

3. A thermal recording apparatus according to claim 2 wherein said comparator comprises an inverter connected to said second shift register for inverting the previously received recording signals bit by bit and an AND gate having inputs connected to the outputs of said inverter and said first shift register.

4. A thermal recording apparatus comprising:
a plurality of thermal resistive elements placed in line;
a plurality of drive circuits connected to said thermal resistive elements for driving corresponding ones of said thermal resistive elements;
a plurality of latch circuits connected to said drive circuits for supplying recording signals to corresponding ones of said drive circuits;
a first memory for receiving and storing incoming recording signals which are input in series and formed by 1 and 0 signals, said first memory supplying the incoming recording signals to said latch circuits;
a second memory coupled to an output of said first memory for receiving recording sighals from said first memory and storing the previously received recording signals;
a comparator connected to said first and second memory for comparing the incoming recording signals with the previously received recording signals to generate modified recording signals, the modified recording signals including 0 signals which are generated by said comparator when 1 signals in the incoming recording signals follow 1 signals in the previously received recording signals; and
a third memory coupled to an output of said comparator for storing the modified recording signals, said third memory supplying the modified recording signals to said latch circuits after the incoming recording signals are supplied to said drive circuits.

* * * * *